No. 882,229. PATENTED MAR. 17, 1908.
G. H. BARTLETT.
HEATER.
APPLICATION FILED APR. 4, 1907.
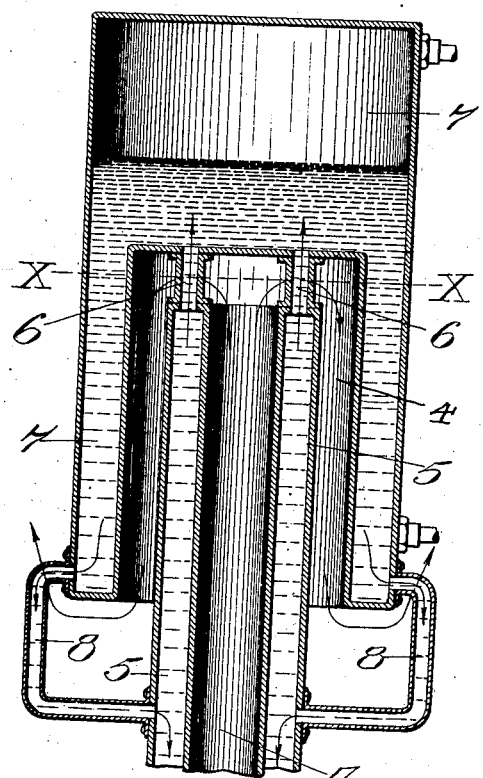
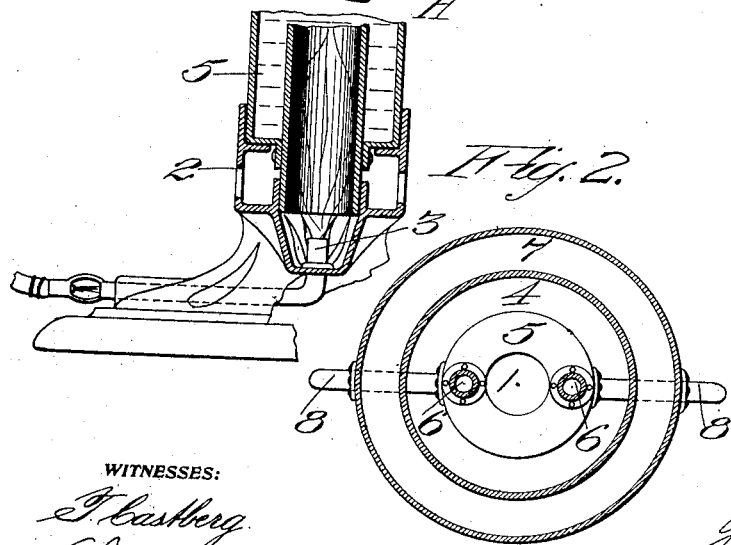
WITNESSES:
INVENTOR
George H. Bartlett.
BY
Geo. H. Strong
ATTORNEY

UNITED STATES PATENT OFFICE.

GEORGE H. BARTLETT, OF SAN FRANCISCO, CALIFORNIA.

HEATER.

No. 882,229.   Specification of Letters Patent.   Patented March 17, 1908.

Application filed April 4, 1907. Serial No. 366,294.

*To all whom it may concern:*

Be it known that I, GEORGE H. BARTLETT, citizen of United States, residing at the city and county of San Francisco and State of California, have invented new and useful Improvements in Heaters, of which the following is a specification.

My invention relates to a heating apparatus.

It consists in the combination of parts, and in details of construction which will be more fully explained by reference to the accompanying drawings, in which—

Figure 1 is a sectional view of the complete apparatus. Fig. 2 is a transverse section taken through X—X of Fig. 1.

It is the object of my invention to provide an apparatus for the convenient and rapid heating of fluids.

As shown in the drawing, A is a vertically supported tube of considerable length having a standard or support 2 within which the lower end is supported. Into the lower part of this support a gas-burner 3 is carried, and the burner tip opens vertically and centrally upward at the bottom of the tube A. The support 2 is formed with elastic tongues, the ends of the tongues extending upward and clasping the lower end of the tube A, and these tongues unite below the tube to form a single tubular support through which the burner pipe is inserted, and within which it may be held. The space below the tongues of the part 2 admit air which, passing around the burner furnish sufficient oxygen for combustion of the gas, and the heat passing up through the tube is received into an exterior case or jacket 4 which is supported from the upper end of the tube A so as to leave a sufficient space for the escape of the products of combustion into the upper part of the casing 4; this casing being closed at the top and open at the bottom, the heat is diverted from the upper end of the pipe 4 and carried downward as shown by the arrows. This portion of the device is sufficient for the heating of air. If it is desired to heat liquids the tube A is inclosed by a jacket 5 which is closed at the bottom, and at the upper end this jacket is connected by tubes 6 with a receptacle 7 which is exterior to the casing 4. Thus this casing 4 is inclosed by the outer receptacle 7, and in turn it incloses the inner receptacle or casing 5. From the bottom of the receptacle 7, pipes 8 extend downwardly and return water from the bottom of the receptacle 7 into the lower part of the tubular receptacle 5.

The operation of the device will then be as follows: The gas being lighted, heat will pass upwardly through the tube A, and the latter will become intensely hot, and the heat from it will be imparted to and carried through the surrounding casing 4 and discharged at the lower end thereof, which will be sufficient to heat a large body of air. When this casing is located between the water-chambers 5 and 7, the heat from it will be rapidly imparted to the liquid within these chambers through the thin metal walls of the casing 4. The liquid heated within the elongated casing 5 will be rapidly carried up through the passages 6 into the upper part of the chamber or receptacle 7, and the natural circulation caused thereby will carry the liquid down around the outside of the heated casing 4, thence through the pipes 8, and into the lower part of the inner chamber 5. This rapid circulation will cause the liquid to be heated in a very short time, and it may be supplied and drawn off at any suitable points by connecting pipes.

Having thus described my invention, what I claim and desire to secure by Letters Patent is—

In a heating apparatus of the character described, a vertical open-ended tube, a burner centrally located below the tube, and means for supplying air thereto, a casing with a closed top and open bottom surrounding the upper part of the tube, and supported to allow heat to pass from the tube into the casing and be discharged downwardly, a liquid containing chamber located between the inner tube and the casing, and extending to substantially the lower end of the inner tube, a second chamber concentric with the tube and first-named chamber and of greater diameter than the latter, said second chamber containing a liquid and having its lower end connected to a corresponding portion of said casing, tubes connecting the upper end of the inner chamber with the exterior chamber, and return pipes connecting the lower end of the exterior liquid containing chamber with the interior liquid containing chamber at a point which is below the plane of the open bottom of the casing.

In testimony whereof I have hereunto set my hand in presence of two subscribing witnesses.

GEORGE H. BARTLETT.

Witnesses:
S. H. NOURSE,
FREDERICK E. MAYNARD.